Dec. 19, 1967   R. STÄUBLI   3,359,562
APPARATUS FOR PLOTTING TIME-SEQUENCE CURVES FOR TIME STUDY
Filed July 15, 1965   5 Sheets-Sheet 1

Fig.1

INVENTOR
Rudolf Stäubli
BY
His Attorney

United States Patent Office 3,359,562
Patented Dec. 19, 1967

3,359,562
APPARATUS FOR PLOTTING TIME-SEQUENCE CURVES FOR TIME STUDY
Rudolf Stäubli, Frohburgstr. 88, Zurich, Switzerland
Filed July 15, 1965, Ser. No. 472,212
Claims priority, application Switzerland, July 17, 1964, 9,398/64
12 Claims. (Cl. 346—35)

ABSTRACT OF THE DISCLOSURE

An apparatus for plotting diagrams of succeeding transverse time-lines for time study. Electrical signal transmitters are provided at the work site for determining the working steps performed thereat, each transmitter containing a programming device and a combination device. Each transmitter is operatively coupled via a programming device with at least two of the combination devices, each combination device incorporating at least two conductors for receiving signals from given programming devices generated by the electrical signal transmitters. A writing device is operatively coupled with each combination device, each writing device remaining switched-in by means of a continuous pulse received from an associated combination device via a conductor of the associated combination device for such length of time until a next pulse according to the program arrives at a different conductor. Means are provided for each combination device to ensure that a similar pulse appearing at the same conductor does not effect any change in the switching conditions.

---

The present invention has reference to an improved apparatus for plotting time-sequence curves or diagrams of succeeding transverse time-lines for time studies incorporating electric signal transmitters provided at the work situs for determining the working or operational steps. Under the term time-sequence curves as employed herein there is to be understood diagrams of succeeding lines which are transverse to the propelling direction of a chart and the length of which is proportional to time.

Apparatuses of this type are already known which can be either only actuated manually or only apply markings onto moving recorder charts in the direction of movement of the paper. In the case of the last-mentioned type apparatus which also apply markings by means of electrical pulses, the time for the plotted working step can only be determined from the feed velocity of the recorder chart. With such representation of the working steps upon the recorder chart evaluation thereof requires a further operational step. For example, the different lengths of the markings, which represent the individually observed working steps at the production site, must be measured by means of a compass or other suitable instrument and transferred onto a diagram of succeeding times i.e. so-called time-sequence diagrams.

Accordingly, it is a primary object of the present invention to provide an improved apparatus by means of which it is possible to eliminate the use of a person for recording the observed working steps or overcomes the need for the additional transfer to a work sequence diagram by a further person.

Another important object of this invention relates to an improved construction of apparatus for plotting diagrams of succeeding transverse time-lines such that it is possible to directly read-off a recording chart pertinent data concerning operational steps performed at a given work site.

A further noteworthy object of the present invention is directed to improved apparatus for plotting diagrams of succeeding transverse time-lines such that they be read and evaluated with a minimum of effort.

The inventive apparatus by means of which it is possible to automatically determine individual operational or work steps is characterized by the features that, each signal transmitter is operatively connected via a programming device, which either further transmits the signals delivered by the signal transmitter without change or resolves such into two pulses, with at least two combination devices. A recording instrument is connected after each combination device and such recording instrument remains switched-in by means of a continuous pulse for such length of time until the next pulse in accordance with the program arrives at a different conductor, and means are provided which ensures that a similar pulse at the same conductor does not cause any change of the switching conditions.

Other features, objects and advantages of the invention will become apparent by reference to the following detailed description and drawings in which.

Figure 1:
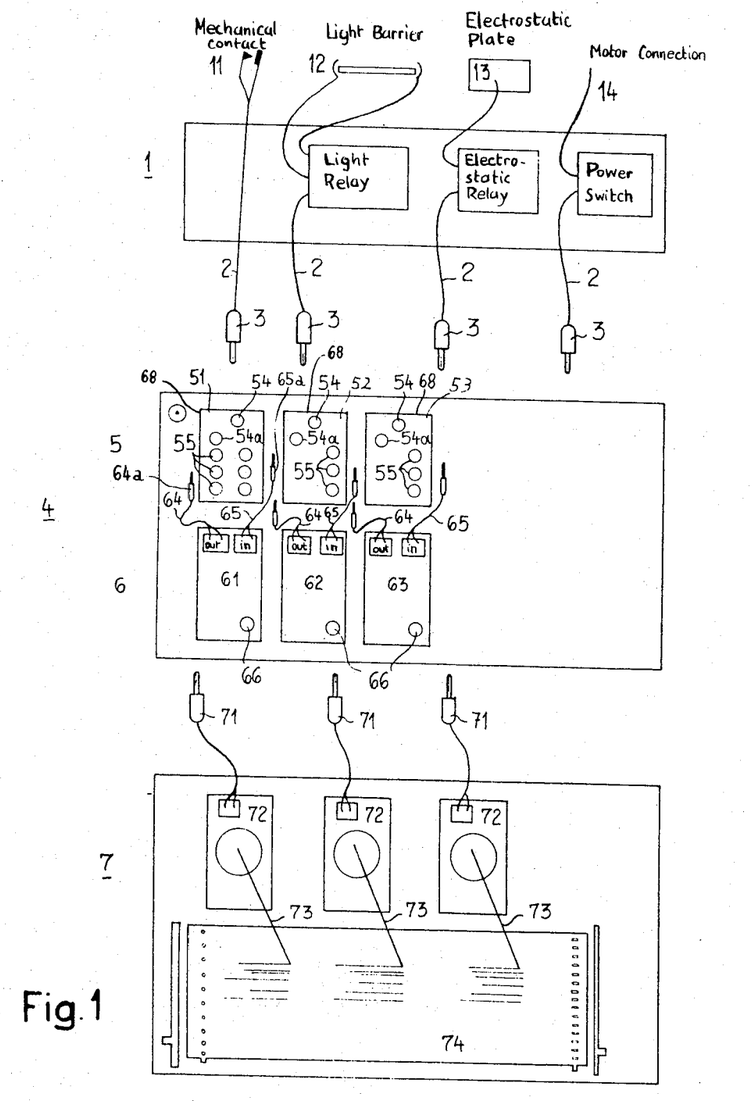
FIGURE 1 is a block diagram of a preferred embodiment of an entire inventive apparatus for plotting diagrams of succeeding transverse time-lines.

Describing now the drawings, and, particularly directing attention to the block diagram of FIGURE 1, it will be understood that reference character 1 designates a series of different signal transmitters provided at the production site. Specifically, by way of example, reference character 11 represents a mechanical contact capable of operable connection with tools or machines of any given type. Reference character 12 represents a light barrier incorporating a photoelectric cell and a light source. Reference character 13 represents an electrostatic proximity switch. Reference character 14 signifies the connection to an electric motor used for driving a machine tool.

It will be understood that in FIGURE 1 there has only been schematically represented a small selection from the many different possible signal transmitters. As further explanatory matter there will now be given a short exemplary listing of further possible signal transmitters which will not be considered in further detail since such are generally known to the art. Such further signal transmitters are:

(a) Mechanical Switches:
  Switches at pushing-levers.
  Switches at turning-levers.
  Passing-switches.
  Switches which function when something is put down.
(b) Special Mechanical Switches:
  Weight switches.
  Switches measuring rotations.
  Hydraulic switches.
  Pneumatic switches.
(c) Photoelectric detectors.
(d) Infrared detectors.
(e) Ultrasonic detectors.
(f) Electrostatic proximity switches.
(g) Magnetic proximity switches.
(h) Acoustic switches.
(i) Geiger counters.
(k) Electrical load switches.
(l) Protective gas-filled magnetic switch, i.e. reed relay.

It is possible to use a protective gas-filled magnetic switch as signal transmitter which switches upon approach of a magnet. The magnet triggering switching can be fixed to a moving part of a machine or to the hand of a worker, triggering the switching operation upon assuming a predetermined position.

Depending upon the strength of the magnet there is a certain distance (switching-in distance) of the magnet from the protective gas-filled magnetic switch at which switching occurs and a certain somewhat larger distance (de-energization or switch-out distance) at which the protective gas-filled magnetic switch again opens the contact or switch. In the case of a bar magnet both switching distances are greatest when the bar magnet is parallel to the protective gas-filled magnetic switch. The switching distances can be increased by about 45% to 60% if a second magnet is fixedly mounted at a distance somewhat further than its de-energization distance. In so doing, the fixedly mounted magnet and the magnet triggering switching must have the same poles arranged at the same side.

The signal transmitters, depending upon the work steps to be observed (switching-in and switching-out of machines, working manipulations of the operator at the machine), are either connected to the machines themselves or to the tools which the operators have to actuate. In the following list there is a short compilation of different types of fastenings which have not been further explained in detail since such are generally known:

A. FASTENING

*(a) Fastening at rods, levers*

(1) tension-fixation
(2) clips
(3) forked-clamps
(4) fixation with adhesives

*(b) Fixing at plates, flat iron and sheet metal*

(1) clips
(2) magnets

*(c) Fixing at larger objects or bodies*

(1) tension-bands
(2) fixation with screws that are already in place
(3) tenter frames
(4) fixation with magnets
(5) fixation with adhesives
(6) fixation with suction caps

B. ELEMENTS WHICH BRIDGE SPACES (1) spacer elements
(2) turning elements

C. ELEMENTS FOR ACCURATE ADJUSTMENT (1) distance adjustment
(2) radial adjustment Of the above-mentioned different types of fastenings there will only be further described in greater detail, by way of example, the suction cup fastening. For the rapid attachment of switches there are provided suction cups which are safe-guarded against falling-off support surfaces possessing irregularities through the flowing-in of air, by virtue of the fact that they are continually exposed to the action of a vacuum pump. Such an arrangement makes certain that the suction cups also remain fixed when applied to poor supports, for instance wood. In order that the switch can be sufficiently accurately adjusted at the contact-giving object the suction cups must be geometrically stable. This is achieved with flat surfaces in that the body of the suction cup consists of a rigid metal cover and only for sealing at the support surface there is employed rubber of approximately 60°– Shore. With curved or arched surfaces this is achieved by using a soft suction cup for generating the holding force, and for geometric stabilization three to four adjustable struts are employed which are supported upon the surface in such a manner that they lift the suction cup about 1 to 2 millimetres and thus consume a portion of the holding force in order to positively ensure for geometric stabilization.

In FIGURE 1 the therein depicted exemplary signal transmitters 11, 12, 13 and 14 are each provided with a conductor 2 closed at one end with a respective coaxial plug 3. The block 4 represents the subsequent circuit which essentially consists of a programming assembly 5 and a combination assembly 6. There are as many individual programming apparatuses 51, 52, 53 etc. as there are conductors 2 for the individual signal transmitters 11, 12, 13, 14, etc. To simplify the drawing only three programming devices 51, 52 and 53 have been shown. In this instance, each programming device 51, 52, 53 is comprised of an inlet 54 and a series of outlets 55. Furthermore, combination devices, here indicated at 61, 62, 63, etc. are coupled in the circuit of block 4 and there are many such combination devices 61, 62, 63, etc. as there are programming devices 51, 52, 53, etc. Hence, in the drawing there are also only shown three such combination devices 61, 62 and 63. Each of the inlets of these combination devices 61, 62 and 63 exhibits two respective double wire connection cables 64 and 65 possessing coaxial plugs 64a and 65a respectively at their ends. These coaxial plugs 64a, 65a are inserted in desired outlets 55 of the programming device 51, 52, 53, etc. in accordance with the desired program.

The conductors or connection cables 64 are provided for switching-out the combination devices 61, 62, 63, etc. and the conection cables 65 for switching-in such combination devices. For instance, the connection cable 65 of the combination device 63 is inserted in one of the outlets 55 of the programming device 53 so that the switching-in pulse can arrive at the combination device 63. The connection cable 64 for the switching-out pulse to the same combination device 63 is inserted in an outlet 55 of the programming device 52. From the foregoing it follows that the conductors or connection cables 65 of all other combination devices 61, 62, etc., in each instance, are inserted in one of the outlets 55 of the associated programming device and the conductors 64 for the switching-out pulse in the outlet 55 of the subsequent programming device. Each combination device 61, 62, 63, etc., possesses an outlet contact 66 in which there is inserted a coaxial plug 71 of a respective recording or writing instrument 72. Reference character 7 generally designates the group of recording instruments for plotting the diagrams of succeeding transverse time-lines. Such is essentially composed of individual recording or writing devices 72 which, by means of writing pens 73, plot the so-called time sequence curves or diagrams of succeeding transverse time-lines upon a continually moving recording chart 74. The number of recording instruments 72 can be optionally selected, in the drawing only three have been shown by way of example.

An outlet terminal 54a is provided at each of the programming devices 51, 52, 53 etc. They serve to connect the recording instruments 72 by means of their coaxial plugs 71 with the signal transmitters 11, 12, 13, 14, etc. via the programming devices 51, 52, 53, etc. while bypassing the combination devices 61, 62 and 63.

Figure 2:
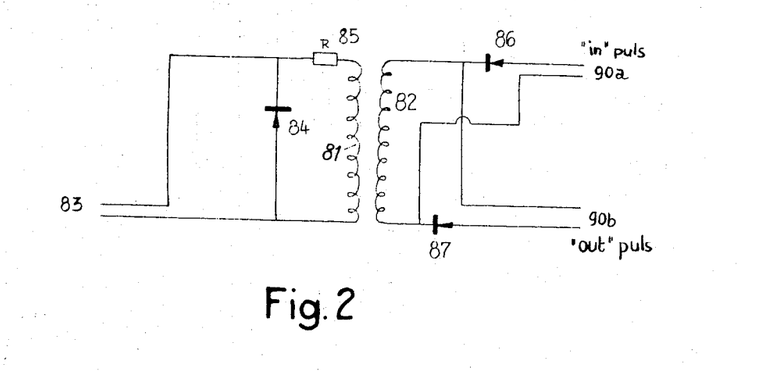
FIGURES 2, 4, 6 and 8 are schematic illustrations of respective programming devices.

Now having had an opportunity to consider the overall arrangement of the inventive apparatus of FIGURE 1, by referring to FIGURE 2 it will be recognized that there is schematically depicted an embodiment of programming device having a primary winding 81 and secondary winding 82. The input side 83 is connected with contact 54 of a programming device. The diode 84 and the resistor 85 serve for faultless termination of a pulse delivered from one of the signal transmitters 1. Both terminals 90a and 90b of the secondary winding 82 provide the outlet for an "in" pulse and "out" pulse respectively. Both of the diodes 86 and 87 are connected such that both of the oppositely polarized pulses which occur upon switching-in the primary winding 81 and by switching-out the same, only pass in one or the other direction, so that the impulse at the primary side 81 is divided into two pulses. It will be appreciated that the illustrated embodiment of programming device of FIGURE 2 has an input 83, corresponding to input 54 of FIGURE 1, and two outputs 90a and 90b, corresponding to the outputs 55 of FIGURE 1.

Figure 3:
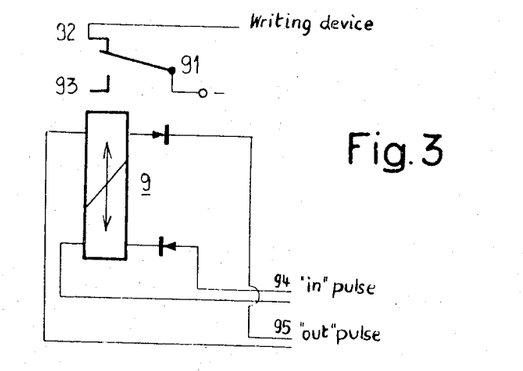
FIGURES 3, 5 and 7 each schematically illustrate a respective embodiment of combination device.

FIGURE 3 illustrates an embodiment of combination device capable of use with the programming device of FIGURE 2 and incorporates a polarized relay 9 possessing two terminals 94 and 95 which are connected with both of these secondary terminals 90a and 90b respectively of FIGURE 2. The polarized relay 9 provides a combination device analogous to that depicted in FIGURE 1 and designated by reference characters 61, 62 or 63. The polarized relay 9 depending upon the pulse (in or out) has its contact 91 either moved to position 92 or position 93. With the illustrated position of the contact 91 this means that a given recorder instrument 72 receives a continuous pulse via the coaxial plug 71, with the associated writing pen 73 magnetically coupled to the continuously revolving drive motor and, thus, plots diagrams of succeeding transverse time-lines upon the recording chart 74.

Figure 4:
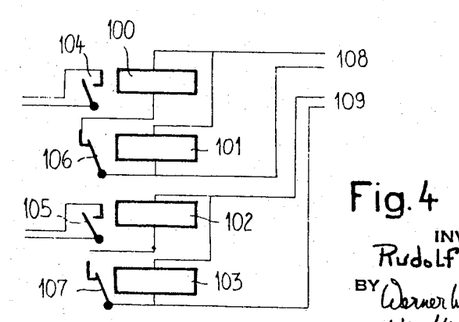

FIGURE 4 illustrates a further embodiment of programming device as such has been generally depicted by reference character 5 in FIGURE 1. It comprises two pairs of relays 100, 101 and 102, 103. The relays 100 and 102 actuate the work contacts 104 and 105 respectively and the relays 101 and 103 the rest contacts 106 and 107 respectively. A pair of relays, for instance relays 100, 101, are connected such that with a first pulse which is delivered from a signal transmitter 1 to the input 108 the relay 100 attracts its work contact 104 and the relay 101 by opening the rest contact 106 causes the relay 100 to again de-energize. As a result, only a short pulse is delivered to the subsequently connected combination device 6 via the work contact 104. In order to generate a switching-out pulse which should arrive with the aid of the contact 105 at the subsequently connected combination device, it is only necessary that a further pulse from the signal transmitter is applied to the input 109. In this connection, there is assumed for instance, that there is provided a signal transmitter which possesses a work contact and a rest contact. The work contact of the signal transmitter is connected at 108 and its rest contact at 109.

The programming device of FIGURE 4 composed of four relays 100–103 can also equally be employed for two relays for instance. In such case only the relays 100 and 101 are used, the relay 100 actuating the work contact 104 and rest contact 107, and the relay 101 which is delayed in energization and de-energization actuates the rest contact 106 and work contact 105. The contacts 104 and 106 are connected in series in a current circuit and the contacts 105 and 107 are connected in series in a second current circuit. Due to such circuit connection there is achieved that with simultaneous application of a voltage to relays 100 and 101 the work contact 104 delivers a short pulse to the subsequently connected combination device, since due to the delay in excitation the relay 101 and the rest contact 106 are not yet actuated. Switching-out of a pulse at the subsequently connected combination device is prepared by means of the contact 105 during response of the relay 101, and is then first delivered when the relay 100 again de-energizes due to the absence of current and thus switches the contact 107 into its rest position. Since the relay 101 is also delayed in de-energization upon de-energization of such relay 101 the pulse is terminated, relay 101 being disconnected simultaneously with relay 100 from the voltage.

Figure 5:
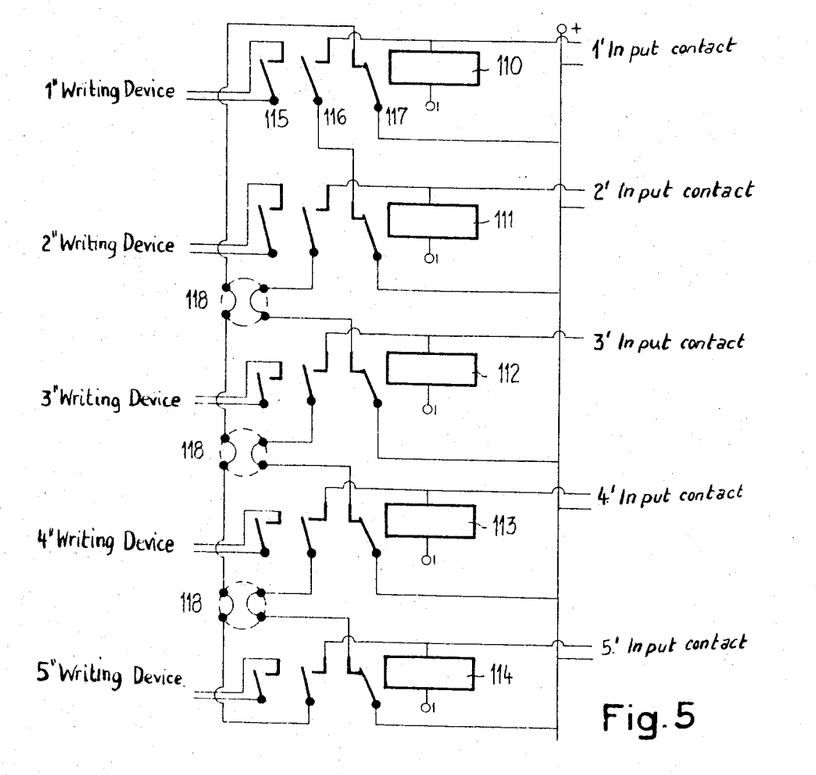

In FIGURE 5 there is illustrated a circuit diagram for a combination device with, for instance, five unpolarized relays 110 to 114. This entire circuit constitutes a group of five combination devices. The five relays exhibit five inputs which are designated by the input contacts or switches 1', 2', 3', 4', 5'. For instance, the output of the work contact 104 (FIGURE 4) can be connected with the relay 110, the output of the contact 105 with the relay 111. Each of the five relays 110–114 has the same contact pieces. There is a work contact 115 for delivering a continuous impulse to the corresponding writing or recording instrument, here writing device 1'', a work contact 116 for self-holding the relay 110, a rest contact 117 which releases the self-holding of the relay 114 which previously had been actuated in accordance with the program. Reference numerals 118 designate three rotary or selector switches which interrupt the program sequence of the relays 110 to 114. With the depicted position of the switches there exists the fixed sequence beginning with the relay 110 and continuing to relay 114, then again to relay 110 and so forth. Now, if the rotary switch 118 between relays 111 and 112 is rotated through about 90°, then the cycle of the relay sequence is only between relays 110 and 111. The following relays 112 to 114 no longer participate in the cycle.

Figure 6:
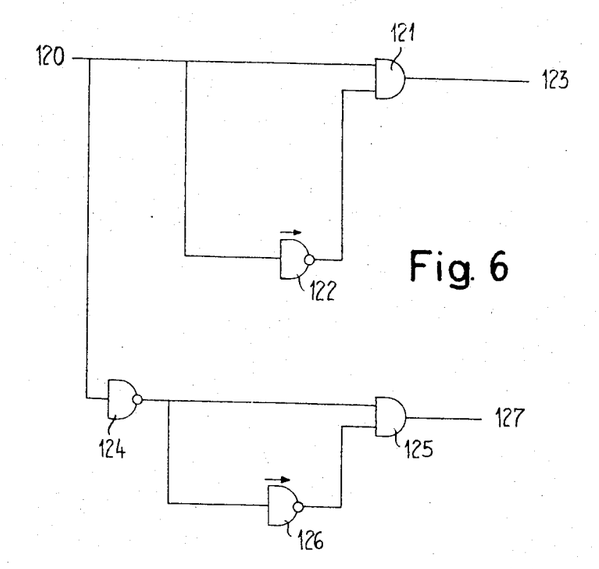

FIGURE 6 illustrates an embodiment of programming device in the form of a logical circuit. Reference character 120 designates the connection to a single transmitter. A continuous impulse arriving at location 120 is delivered to an AND-gate 121 so that it together with the already available pulse from the NO-gate 122 operating with time-delay delivers a short pulse to its output 123. A further NO-gate 124 is arranged parallel to the input 120 which only then delivers a pulse to the AND-gate 125 when no impulse is present at the input 120. The manner of operation of the NO-gate 126 operating with time-delay in conjunction with the AND-gate 125 is the same as already described above. In this manner there likewise arrives at the output 127 a short pulse only then upon termination of the impulse at the input 120.

Figure 7:
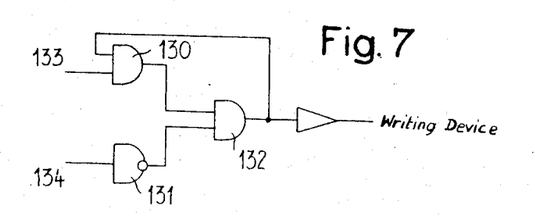

FIGURE 7 depicts an embodiment of combination devices analagous to combination device 61 or 62 or 63 of FIGURE 1. This circuit essentially consists of an OR-gate 130, a NO-gate 131 and an AND-gate 132. When at the input 133, which for instance can be connected with the output 123, an impulse arrives at the OR-gate 130 then in cooperation with the NO-gate 131 the AND-gate 132 is switched-in. The feedback delivered from the output of the AND-gate 132 to the second input of the OR-gate 130 maintains the AND-gate 132 in operation, specifically for such time until a cut-off pulse at the input 134 arrives at the NO-gate 131. This input 134 can for instance be coupled with the output 127.

It is also possible to use a reed relay as combination device which possesses at least two coils. If, for example, three coils are provided, then the circuit is as follows:

A coil (switch-in coil) is coupled with the conductor which delivers the switch-in pulses, i.e. conductor 65 in FIGURE 1;

The second coil (cut-out or switch-out coil) is connected with the switch-out conductor, i.e. conductor 64 in FIGURE 1;

The third coil (holding-coil) has continuously flowing through it a holding current having half the current intensity of the switch-in current.

The mentioned switch-in coil generates a field which is then parallel to the field of the holding coil. The cut-out or switch-out coil generates a field which is opposite the field of the holding coil. Both coils are supplied with a current possessing half the switch-in current intensity. Thus, if a switch-in current arrives via conductor 65 of FIGURE 1 at the relay then it produces together with the holding current a field sufficient to close the contact of the relay. The relay also remains closed when the switch-in pulse again interrupts since the holding current is just sufficient to hold the relay in closed state, not however to close it.

If in FIGURE 1 a switch-out pulse arrives via the conductor 64 at the relay, then such breaks down the field generated by the holding current since it is of the same magnitude but oppositely directed. As a result, the contact or switch opens. In this manner there is ensured that the relay is closed by the switch-in pulse and remains closed for such time until the switch-out pulse at another conductor opens it again. A number of repetitions of the same pulse does not change anything in the switching position of the relay.

The circuit arrangement of FIGURE 1 can still be refined in that a switching device is provided at each output 66 of the combination devices 61, 62 and 63. In the event that combination is made with relays then such are simply further contacts of the relay. With electronic elements a relay must be connected at the output 66 parallel with the writer means 72. In this circuit arrangement a respective conductor leads to the output and to the input of the centrally arranged amplifying device of one of the signal transmitters, for instance light relay, electrostatic proximity switch. With a multiple switch it can be determined ahead of time to which amplifying device the conductor is led.

In order to further explain the invention, let it be assumed that the program switch is adjusted to the light relay. Moreover, it has been established that the switch-in pulse has been produced by a photoelectric cell, and that the switch-out pulse should be produced by another photoelectric cell. Now, the switches of the relay connected to the output 66 interrupt the connection of the photoelectric cell which previously was connected with the light relay and at the same time connect the light relay which the photoelectric cell which should deliver the next pulse according to the program.

At the same time connection of the light relay with the programming device 54 which delivers the switch-in pulse is interrupted and there is provided an operable connection to the subsequent programming device in accordance with the program. In this manner, it is possible to provide only one light relay in the apparatus, yet to control such from an optional number of photoelectric cells and to conduct its pulse always to the correct location according to the program. Hence, it is thus possible to save space, also costs.

Figure 8:
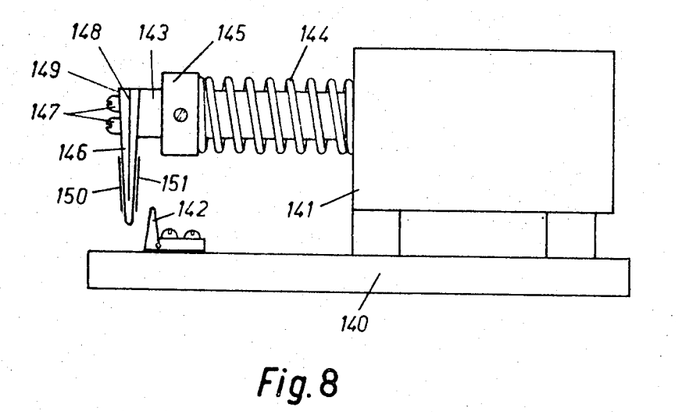

FIGURE 8 illustrates the principles concerning the construction of a programming device as generally depicted in FIGURE 1 by reference character 5. A solenoid or lifting magnet 141 and a contact-maker or contactor blade 142 are mounted upon a base plate 140. The movable portion 143 of the solenoid 141 is provided with a return spring 144 mounted between an adjusting ring 145 and the body of the solenoid 141. A contact-maker 146 is fixed by two screws 147 to the forward end of the solenoid 141. It consists of a thin steel spring 148 and a plastic covering 149. The steel spring 148 ensures for return of the contact maker 146 into the rest position after wiping the contact-maker or contactor blade 142. The plastic covering 149 serves to dampen oscillations. Both contact plates 150, 151 are mounted at the lower end of the contact maker 146. Upon energization of the solenoid 141 the contact plate 151 wipes against the contact maker blade 142 and thus delivers a short pulse. The means for delivering current have been omitted from the drawing for the sake of clarity. When the current is switched-out the contact plate 150 wipes over the contact-maker 142 and delivers a short pulse. In both cases, due to dampening of oscillations by the plastic covering 149 it is prevented that the contact spring 148 after wiping the contact maker 142 swings back, and, for instance, during switching-out after making contact with the contact plate 150 makes a false contact by the contact blade 151 due to swinging back. This arrangement enables a continuous impulse to be divided into a short switch-in pulse and a short switch-out pulse.

It is also contemplated that the movable portion of a contact-maker or contactor blade which is fixedly guided in a channel moves. A small plastic plate is transversely disposed in this channel. It is rotatably mounted. In its rest position it lies transversely in the channel, so that it is moved by the contactor blade during the switching-in movement to one side of the channel, during the switch-out movement to the other side. Since it is provided at each side with a conducting material which is connected with a respective output, the switching-in operation as well as the switching-out operation can deliver a respective pulse to different conductors.

It is also within the framework of the invention to use a roller as the contact-maker which during each movement first carries out a small rotation, whereafter it is fixedly retained by a stop and slides over a contact surface. At each terminal position of the movement there is applied, in commutator-like fashion, a respective conducting segment with respect to the contact surface, which again generates a respective short "in" pulse and a short "out" pulse.

It is further contemplated to displace a pin member with the movable element, such pin being guided in a guide arrangement such that during the switch-in movement it undertakes a different path than during the switch-out movement. A respective spring contact is applied during passage both through the switch-in movement as well as during passage through the switch-out movement, and which upon passing the pin member is closed for a brief period.

Also contemplated is the mounting of a snap device with two terminal positions left and right at the movable element, whereby a respective cam throws the snap device shortly before reaching the terminal position of the switch-in movement and the switch-out movement. As a result, it is again possible that during the switch-in movement there can be actuated a spring contact at the one side and by the switch-out movement a spring contact at the other side.

It is also possible to use a vertically arranged solenoid in which a plunger or core moves. A contact spring is mounted at a short distance from each end of the solenoid. In the rest position, the core bears against the lower contact spring so that it is just not yet closed. Upon switching-in the current, the core moves upwards and for a moment closes the upper spring contact, thereafter to again fall back into its rest position when the current is switched-in. By utilizing an appropriate magnetic or hydraulic dampening there is ensured that the core does not bounce back and also briefly closes the lower contact spring. When the current is cut-off the core falls-down and for a short moment closes the lower contact spring. Thereafter, it returns to its rest position. In this manner, an impulse can be divided into a short switching-in pulse and a short switching-out pulse.

It is also further contemplated by means of the movable element to move a contactor blade which at one end possesses a flexure towards the right and at the other end a flexure towards the left. It wipes past a contact-maker having the same form, but at both sides possesses two electrically separated contact surfaces. Due to the bending or flexing of both contact elements there is ensured that the contactor blade during the switching-in motion wipes past the one side of the contact-maker, during the switching-out movement past the other side. As a result, there is again ensured for division of an impulse into a short "in" pulse and a short "out" pulse.

It is also pointed out that the programming device 5 of FIGURE 1 can be constructed for either not subdividing as well as also for sub-dividing the signal coming from the signal transmitter into two pulses. The programming devices 52, 53 depicted in FIGURE 1 are not equipped with any dividing mechanism according to FIGURES 2, 4 and 6 and, thus, only possess three outputs 55. They can be used for the selection of short pulses from the signal transmitters. In this instance, it is possible to supply the "in" pulse coming from the programming device 53 to the combination device 63 and the "out" pulse from the programming device 52 to the combination device 63. In this manner, there is ensured that the writing instrument 72 plots the diagrams of succeeding transverse time-lines of a working step.

The programing device 51 is provided with six outputs or outlets 55. This means that this programming device 51 is provided with a dividing device according to FIGURE 2 or 4 or 6. The "in" pulses are available at the right outlets 55 and from there can arrive at the combination device 61. The "out" pulses are available at the left row of outlets 55 and can be delivered to the combination device 61. With this apparatus it is possible to utilize in advantageous manner longer signals coming from the signal transmitters in the manner that optional commands can be delivered in optional sequence to optional combination devices. Thus, it is possible to recall a continuous impulse of the combination device 61 which has been called upon by a signal transmitter which delivers a longer impulse such recall being during such time as this longer impulse still exists. In this manner it is possible that the recorder or writing device 72 during its writing operation and which has been brought about by a first signal transmitter, is switched-out by another signal transmitter.

Hence, it is possible to supervise a working operation or procedure by means of different signal transmitters and to combine the signals of these signal transmitters in such a manner that the individual manipulative steps can be directly plotted in the form of diagrams of succeeding transverse time-lines upon the recording chart 74 of the writing mechanism. It is also mentioned that the programming devices 51, 52, 53, etc. consisting of respective plates 68 having an inlet 54 and a plurality of outlets 55 are arranged to be exchangeable.

By means of three different writing instruments with stepped speeds in a ratio of 1:10 it is possible to record a large range of times in a form which can be easily optically visualized. Likewise, the recording chart 74 can be moved with different feed velocities.

While there is shown and described present preferred embodiments of the invention it is to be distinctly understood that the invention is not limited thereto but may be otherwise variously embodied and practised within the scope of the following claims.

What is claimed is:

1. Apparatus for plotting diagrams of succeeding transverse time-lines for time study comprising, in combination: electrical signal transmitters provided at a work site for determining the working steps performed thereat, a programming device and a combination device provided for each electrical signal transmitter, each electrical signal transmitter being operatively coupled via a programming device with at least two of said combination devices, each combination device incorporating at least two conductors for receiving signals from given programming devices and generated by said electrical signal transmitters, a writing device operatively coupled with each combination device, each writing device remaining switched-in by means of a continuous pulse received from an associated combination device via a conductor of the said associated combination device for such length of time until a next pulse according to the program arrives at a different conductor, and means provided for each combination device to ensure that a similar pulse appearing at the same conductor does not effect any change in the switching conditions.

2. Apparatus for plotting diagrams of succeeding transverse time-lines for time study as defined in claim 1 wherein at least some of said programming devices incorporate means for transmitting signals received from the associated electrical signal transmitter without change.

3. Apparatus for plotting diagrams of succeeding transverse time-lines for time study as defined in claim 1 wherein at least some of said programming devices incorporate means for dividing signals received from an associated electric signal transmitter into two pulses, and wherein said two pulses include an "in" pulse and an "out" pulse.

4. Apparatus for plotting diagrams of succeeding transverse time-lines for time study as defined in claim 1 wherein each programming device incorporates an exchangeable plate member provided with an inlet and a plurality of outlets.

5. Apparatus for plotting diagrams of succeeding transverse time-lines for time study as defined in claim 1 wherein each programming device incorporates an inlet and a plurality of outlets, said conductors of given combination devices being connected with given outlets of a given programming device in such a manner that a pulse appearing at the outlet of said programming device switches out an operating writing device associated with a given combination device and switches in according to the program the subsequent writing device associated with another combination device.

6. Apparatus for plotting diagrams of succeeding transverse time-lines for time study as defined in claim 1 wherein at least some of said programming devices incorporate means for dividing a signal received from an associated electrical signal transmitter into an "in" pulse and an "out" pulse, and wherein at least one of said at least some programming devices comprises a circuit incorporating a first relay provided with a work contact and a second relay provided with a rest contact, said first and second relays being operably coupled with one another such that after a certain time after the first relay responds said second relay de-energizes said first relay.

7. Apparatus for plotting diagrams of succeeding transverse time-lines for time study as defined in claim 1 wherein at least some of said programming devices incorporate means for dividing a signal received from an associated electrical signal transmitter into an "in" pulse and an "out" pulse, and wherein at least one of said at least some programming devices comprises a logical circuit incorporating an AND-gate and time-delayed NO-gate for said "in" pulse, and a NO-gate coupled with a further AND-gate and a time-delayed NO-gate for said "out" pulse.

8. Apparatus for plotting diagrams of succeeding transverse time-lines for time study as defined in claim 1 wherein each of said combination devices further includes means which deliver a continuous pulse to an associated writing device in the time between two pulses arriving at different conductors.

9. Apparatus for plotting diagrams of succeeding transverse time-lines for time study as defined in claim 8 wherein each of said combination devices is provided with a polarized relay.

10. Apparatus for plotting diagrams of succeeding transverse time-lines for time study as defined in claim 8 wherein each combination device includes a logical circuit provided with an OR-gate and a NO-gate, an AND-gate coupled with said OR-gate and NO-gate, feedback means disposed between an output of said AND-gate and an input of said OR-gate for maintaining the pulse actuating an associated writing device.

11. Apparatus for plotting diagrams of succeeding transverse time-lines for time study as defined in claim 1 wherein at least some of said programming devices incorporate means for dividing a signal received from an associated electrical signal transmitter into an "in" pulse and an "out" pulse, and wherein at least one of said programming devices incorporates a solenoid having a movable member, said movable member being provided with means for making a short electrical contact with a conductor during its switching-in movement and during its switching-out movement making a short electrical contact with another conductor, said means of said movable member providing the switching-in and switching-out electrical contact incorporating a spring, a plastic covering for said spring for dampening oscillations, a contact plate provided at each side of said plastic covering, a contact-maker cooperating with said spring such that one of said contact plates touches said contact-maker during the switching-in movement and the other contact plate touches said contact-maker during the switching-out movement, whereby an impulse is divided into a switching-in pulse and a switching-out pulse appearing at a respective conductor.

12. Apparatus for plotting diagrams of succeeding transverse time-lines for time study as defined in claim 1 wherein each switching-in pulse for a given combination device simultaneously delivers a switching-out pulse for all other combination devices, the sequence of said electrical signal transmitters being optionally variable.

References Cited
UNITED STATES PATENTS 2,207,715    7/1940    Bumstead ___________ 346—49
3,161,455   12/1964    Gorrell _____________ 346—34

RICHARD B. WILKINSON, *Primary Examiner.*

L. M. LORCH, *Assistant Examiner.*